June 5, 1951 — A. M. WICKWIRE — 2,555,772
DELAYED ENGAGEMENT LIQUID CLUTCH
Filed July 24, 1945 — 3 Sheets-Sheet 1

Inventor
Arthur M. Wickwire
By Frease and Bishop
Attorneys

June 5, 1951        A. M. WICKWIRE        2,555,772

DELAYED ENGAGEMENT LIQUID CLUTCH

Filed July 24, 1945        3 Sheets-Sheet 3

Inventor
Arthur M. Wickwire
By Freese and Bishop
Attorneys

Patented June 5, 1951

2,555,772

UNITED STATES PATENT OFFICE 2,555,772

DELAYED ENGAGEMENT LIQUID CLUTCH

Arthur M. Wickwire, Mountain Lakes, N. J., assignor, by mesne assignments, to Automatic Steel Products, Inc., a corporation of Delaware Application July 24, 1945, Serial No. 606,741

8 Claims. (Cl. 192—105)

The invention relates to clutches and more particularly to a liquid actuated centrifugal clutch in which driving and driven member friction surfaces are forced into driving engagement by the pressure of liquid contained in an annular compartment automatically upon rotation of the driving member, and in which clutch engagement is delayed for a predetermined time after the driving member commences to rotate and without regard to any particular speed of rotation of the driving member; and this application is a continuation-in-part of my application Serial No. 550,533, filed August 22, 1944, now abandoned.

There are prior art examples of clutches of the liquid type in which a body of liquid, usually mercury, is used for effecting a driving connection between a driving member and a driven member. However, when it has been desired to provide for delayed engagement of such clutches, springs have been used which prevent clutch engagement until the driving member reaches a certain selected speed of rotation. However, the use of springs for delaying the engagement of a clutch reduces the amount of torque that may be transmitted at rated speed by a clutch of any given size. The amount of reduction of torque transmission increases as the speed at which delayed engagement is to occur approaches the rated speed of the clutch.

Thus, in a small-sized liquid actuated centrifugal clutch, such as a clutch for a household washing machine, where the normal motor operating speed may be 1,800 R. P. M. and where it may be desired to delay the engagement of the clutch at least until the motor speed has reached say 1,400 R. P. M., the amount of torque which the clutch may transmit at rated speed may be reduced as much as 50 to 75 per cent when springs are used for delayed engagement of the clutch. Accordingly, a larger-sized clutch is required for transmitting the maximum amount of torque that could be transmitted by a smaller-sized clutch if it were not for the use of springs for delayed clutch engagement.

Moreover, it is difficult to accurately control the engagement of a clutch with relation to some particular speed of rotation of the driving member, especially at high speeds, because of variations affecting the friction surfaces to be engaged. Thus, inequalities in the thickness of the friction material, or variations in the friction engaging surface, or variations in operating temperatures, or the presence of moisture, or variations in springs, may prevent accurate speed control of delayed engagement.

It is therefore a principal object of the present invention to provide an improved liquid actuated centrifugal clutch construction which eliminates the use of springs for delayed engagement of the clutch.

It is also an object of the present invention to provide a new liquid actuated centrifugal clutch construction with means for delaying the engagement of the clutch without affecting the amount of torque transmitted by the clutch at rated speed.

Furthermore, it is an object of the present invention to provide a new liquid actuated centrifugal clutch construction with means for delaying the engagement of the clutch independent of any particular speed of rotation of the driving member.

Moreover, it is a fundamental object of the present invention to provide a new liquid actuated centrifugal clutch construction in which clutch engagement is determined primarily by the lapse of a certain predetermined time interval after the clutch driving member has commenced to rotate or after the driving member has attained rated speed.

I have discovered that if the clutch actuating liquid is contained in an annular compartment having smooth walls in a circumferential direction, a certain time interval elapses after the annulus walls have commenced to rotate or have attained a desired speed of rotation and before the body of liquid contained in the annular compartment rotates at a speed sufficient to develop clutch engaging pressure. This condition is believed to result because of the static inertia of the body of liquid contained in the annular compartment and because of the low coefficient of friction between liquid and a smooth walled surface. The time lag is apparently determined by the volume of the annulus or the volume and weight of the liquid contained therein, the mean diameter of the annulus, the surface area of the annulus or the area of liquid contact with the annulus walls, and the viscosity of the liquid.

Thus, the larger the volume of the liquid and the greater the weight of the liquid, the greater is the static inertia of the liquid which must be overcome to effect rotation of the body of liquid upon rotating the annulus walls. Also, the smaller the area of liquid contact with the annulus walls, the smaller is the total friction developed at the contact area ultimately causing rotation of the body of liquid upon rotating the annulus walls.

Moreover, since the ratio of annulus surface to volume decreases for any fixed volume upon decreasing the mean diameter of the annulus, an annular liquid containing clutch compartment having a radius from the axis of rotation of the clutch to the center of gravity of a section of the annulus, as short as possible, provides for a maximum volume of liquid in the compartment with a minimum area of liquid contact with the annular compartment walls. Also, the smaller the mean diameter of an annulus, the smaller is the velocity of the annulus walls during rotation thereof.

Liquid actuated centrifugal clutches operate to centrifugally throw liquid outward in an annular compartment of maximum mean effective diameter, thereby developing pressure effecting clutch engagement. If there is a delay in throwing the liquid outward into pressure effective position and location, the clutch engagement is delayed.

The foregoing discoveries and principles are utilized in accordance with the present invention to provide delayed clutch engagement. A maximum volume of liquid is contained in a smooth walled annular compartment having a minimum mean diameter and a minimum area of liquid contacting the annular walls when the clutch is at rest. A certain time interval elapses after the clutch driving member commences to rotate and before the static inertia of the liquid body is overcome and before sufficient frictional resistance is developed between the liquid and the smooth annular walls to cause the liquid body to rotate at a speed sufficient to effect clutch engagement. As the liquid body rotates faster and faster, and after the time interval has elapsed, the liquid is thrown outward to form a liquid annulus of maximum mean diameter developing pressure to cause clutch engagement. Finally, maximum pressure at rated speed is developed whereby maximum torque is transmitted by the clutch.

I have discovered that in a clutch incorporating the improvements of the present invention, a time interval of 1 to 1½ seconds or more elapses after rotating the clutch driving member and before clutch engagement results.

Most electric motors accelerate very rapidly under a condition of no load, so as to come up to rated speed under no load in a matter of a fraction of a second. When the improved clutch is connected between an electric motor and the mechanism, for instance, of a washing machine, the motor comes up to full speed in a fraction of a second and there is a time lag of one second or more before the clutch establishes driving engagement between the motor and the mechanism. However, when driving engagement is established, maximum torque is transmitted by the clutch to operate the washing machine mechanism under full load. This avoids increasing the clutch size as explained above in order to provide for the delayed engagement necessary for allowing the motor to come up to speed under no load.

The foregoing discoveries and improvements of the present invention may be incorporated in either an axial or a radial pressure liquid actuated centrifugal clutch. In addition to these improvements in axial and radial pressure clutch construction, the present invention comprehends further improvements in axial pressure clutch construction.

Accordingly, it is a further object of the present invention to provide an axial pressure liquid actuated centrifugal clutch in which the liquid is confined in a liquid-tight compartment without rotary seals and containing only the liquid.

Moreover, it is an object of the present invention to provide an axial mercury actuated centrifugal clutch in which a limited amount of mercury is contained in one compartment free of any other substance and free of loss or contamination; and in which the clutch friction engaging surfaces are contained in a second readily accessible compartment separate from the liquid containing compartment.

Furthermore, it is an object of the present invention to provide an axial mercury actuated centrifugal clutch in which the mercury is contained within a compartment whose shape is changed by the pressure of the mercury upon rotation thereof when clutch driving engagement is established.

Also, it is an object of the present invention to provide an axial mercury actuated centrifugal clutch in which the mercury is contained in a compartment formed by a preferably rubber gland of expansible or changeable shape which is easy to mold, and which is easy to completely fill with mercury and to thereafter seal in a liquid-tight manner, and the gland being collapsible in certain regions upon expansion of other regions thereof during clutch operation.

Finally, it is an object of the present invention to provide an axial mercury actuated centrifugal clutch in which only a small amount of mercury is required for producing comparatively great pressure in a small-sized device and which is extremely simple in construction, durable and effective in operation, and relatively inexpensive to manufacture.

These and other objects and advantages apparent to those skilled in the art from the following description and claims may be obtained, the stated results achieved, and the described difficulties overcome, by the devices, constructions, arrangements, combinations, sub-combinations, parts, and elements which comprise the present invention, the nature of which is set forth in the following general statement, preferred embodiments of which—illustrative of the best mode in which the applicant has contemplated applying the principle—as set forth in the following description and shown in the drawings, and which are particularly and distinctly pointed out and set forth in the appended claims forming part hereof.

The nature of one aspect of the improvements of the present invention may be stated in general terms as including in a clutch wherein driving engagement between driving and driven members is established by the pressure of liquid in a liquid driving chamber formed in the driving member; walls associated with the driving member forming an inner annular chamber closely surrounding the axis of rotation of the driving member; said annulus walls being smooth and uninterrupted circumferentially of the annulus; a quantity of liquid, preferably mercury, in said annular chamber; means substantially confining the liquid in said chamber when the driving member is at rest; friction members associated with or engaging said walls and engageable with a driven member; expansible means for forming a liquid driving chamber communicating with said inner annular chamber into which the liquid is thrown centrifugally outward to exert pressure against said friction members thereby moving them into driving engagement with the driven member; said liquid driving chamber when formed having an annular shape and a mean diameter substantially larger than the mean diameter of the inner annular chamber whereby the static inertia of the liquid in the inner annular chamber and the relatively small annular wall surface contacted by said liquid delays for a predetermined time the rotation of the liquid in the annulus and the establishment of centrifugal force which throws the liquid outward thereof, thereby enabling the driving member to come up to speed upon rotation thereof before the clutch is engaged and providing for the transmission of maximum torque when the clutch is engaged.

The nature of another aspect of the improvements of the present invention may be stated in general terms as including, in an axial liquid, preferably mercury, actuated centrifugal clutch, a hollow drum-like driven member having interior clutch friction surfaces; the driven member preferably being rotatably journaled on a driving member; the driving member including a tubular sleeve and a plurality of friction members mounted on and rotatable with the sleeve and axially movable with respect thereto; the friction members being adapted for engagement with the clutch driven member friction surfaces; an annular rubber gland generally U-shaped in cross-section, a portion of the gland being enlarged to bulb-like shape forming an inner annular chamber closely surrounding the tubular driving member sleeve, certain of the gland walls being expansible toward the friction members; the inner surfaces of portions of the gland walls substantially contacting each other when the driving member is at rest; annular means securing the gland legs in liquid-tight sealing relation; a quantity of mercury contained within and preferably completely filling the bulb-like annular cavity of the gland; and means substantially confining said body of mercury within the inner annular chamber when the driving member is at rest; whereby there is a lag of a predetermined time interval after the driving member reaches full speed upon rotation thereof and before the mercury rotates sufficiently in the inner annular chamber to be thrown outward by centrifugal force between the axially expansible gland walls to form an annular driving chamber therebetween in which the mercury is contained under pressure in an annular ring having a substantially larger mean diameter than the mean diameter of the inner annular chamber; the pressure of the mercury in the liquid driving chamber thus formed moving the friction members axially into driving engagement with the driven member; and the walls of the inner annular chamber meanwhile collapsing because of the evacuation of mercury thrown outwardly therefrom.

By way of example, preferred embodiments of the improved clutch are illustrated by the accompanying drawings forming part hereof, wherein.

Similar numerals refer to similar parts throughout the drawings.

An axial clutch incorporating the improvements of the present invention is illustrated in Figs. 1 to 4. The driving member includes a driving sleeve 1 which may be secured to a driving shaft 2 by a key 3 engaged in keyways 4 and 5, respectively, in the sleeve 1 and shaft 2. The sleeve 1 may also be provided with a set screw 6 engaging shaft 2. One end of sleeve 1 is provided with spline grooves 7 and intervening spline ribs 8, the ribs 8 being shorter than the grooves 7 and the ends thereof forming shoulders for spacing the thrust washers 9.

A bearing sleeve 10 surrounds sleeve 1 and journals the hub 11 of the driven member housing generaly indicated at 12 which preferably includes a radial wall 13, terminating in an outer annular flange wall 14. A housing plate 15 is seated in a groove 16 formed in the wall 14 and is held in place by a snap ring 17. A pin 18 is preferably provided in the housing wall 14 projecting inwardly at groove 16, engaged in a notch 19 in housing plate 15 so that cover plate 15 rotates with driven member housing 12. The split ends 20 of the snap ring 17 preferably abut the inner end of pin 18; and apertures 21 may be provided for facilitating removal of the snap ring 17 when desired.

Thust bearing washers 22 are interposed between the thrust washers 9 and the inner surfaces of housing wall 13 and housing plate 15. Thus, the housing 12 is located axially of the sleeve 1 by the thrust bearing washers 22 and the thrust washers 9 which abut against the outer ends of spline ribs 8. Several holes 23 may be formed in the housing wall 13 to permit the escape of excess lubricating material which may be supplied to bearing 10 so that it does not penetrate into the compartment formed by the driven member housing 12.

Two driving member discs 24 formed with spline lugs and grooves 25 and 26 for engagement, respectively, with the driving member spline grooves and ribs 7 and 8 are mounted on the driving sleeve 1 for rotation therewith and are slidable axially thereof because of the spline mounting. Friction material rings 27 are secured in any desired manner, as by cementing, riveting or the like, to the outer surfaces of the disc members 24. The outer faces or surfaces 28 of the friction material rings 27 are adapted for friction driving engagement with the inner surface 29 of driving member housing wall 13 and the inner surface 30 of cover plate 15 when the clutch is in engaged position shown in Fig. 3.

Figures 1, 2, 3, 4:
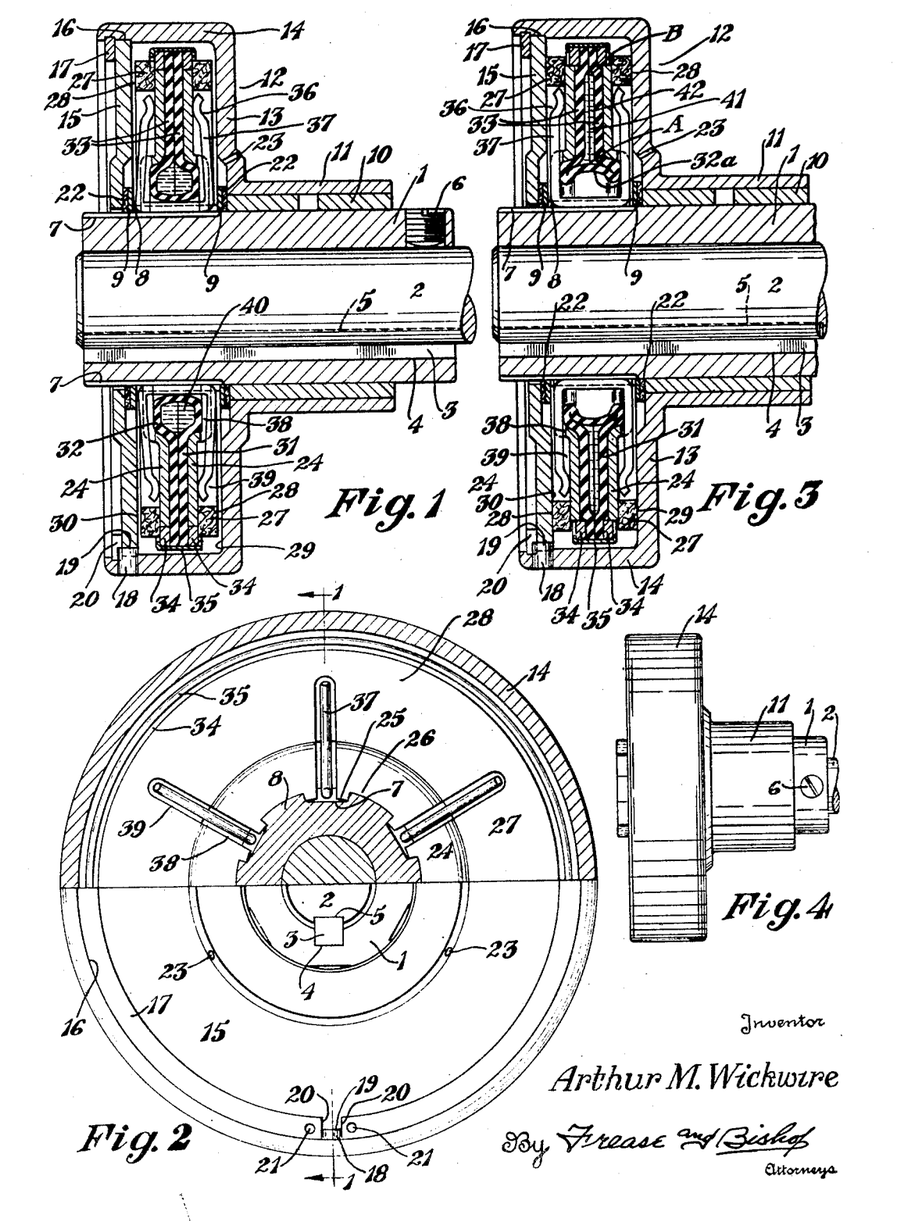
Figure 1 is an enlarged vertical section taken on the line 1—1 of Fig. 2 showing an axial clutch incorporating the improvements of the present invention with the clutch parts in the position that they assume when the clutch is at rest.
Fig. 2 is an end view of the clutch shown in Fig. 1 with parts broken away and in section.
Fig. 3 is a fragmentary view similar to a portion of Fig. 1 but illustrating the parts in the position that they assume when the clutch is running and engaged.
Fig. 4 is a side elevation of the clutch illustrated in Figs. 1, 2 and 3.

An annular flexible preferably rubber gland 31 is interposed between the driving member discs 24. The gland 31 is U-shaped in cross-section with the base of the U enlarged to bulb-like shape 32 as shown in Fig. 1. The legs 33 of the U extend radially outwardly between the inner surfaces of the discs 24, and are clamped, beyond the outer edges of discs 24 between annular rings 34 and a flanged annular clamping ring 35.

As illustrated in Figs. 1 and 3, irrespective of the position of the driving member discs 24, their outer edges are located slidably within and under the inner edges of rings 34 so that the discs 24 center the clamping means for the rubber gland 31, and therefore the rubber gland 31 itself, with respect to the driving member sleeve 1.

A plurality of U-shaped spring clips 36 with the legs 37 thereof located in slots 38 formed in discs 24 and slots 39 formed in the friction material rings 27 are provided to press the discs 24 toward each other when the clutch is at rest as shown in Fig. 1. Thus, the inner surfaces of the gland legs are pressed in contact with each other as shown in Fig. 1 when the clutch is at rest thereby forming an annular chamber, compartment or cavity 40 at the bulb-like gland formation 32.

The inner annular compartment 40 is completely filled with a liquid, preferably mercury, when the clutch is at rest. In accordance with the present invention, the compartment 40 has smooth walls in a circumferential direction and it is located closely around the driving sleeve 1 and therefore has a minimum mean diameter. A maximum amount of mercury is contained entirely in compartment 40 having a minimum area of liquid contacting the annular walls of the bulb-like formation 32 of the gland 31.

In assembling the gland 31, the compartment 40 is completely filled with mercury, the legs 33 are pressed together to expel all gas, air or other material except mercury from within the gland, and the rings 34 and clamping ring 35 are applied to securely close and seal the gland in liquid and gas tight sealing relation. It is important in the form of the clutch shown in Figs. 1 to 3 that only mercury or other actuating liquid be contained within the gland. If gases are contained within the gland they will expand or contract with temperature changes and may actuate the clutch. If the actuating liquid does not completely fill the rubber gland 31, then some breathing device such as described in connection with Figs. 5, 6 and 7 must be provided for the gland to prevent any pressure from being built up within the gland by gas expansion.

In accordance with the present invention, the tension of the springs 36 is only sufficient to maintain the clutch parts in the position shown in Fig. 1 when the clutch is at rest thereby confining the mercury entirely within the inner annular compartment 40 when the clutch is at rest. If the springs 36 or other similar means are not used, the weight of the mercury when the clutch is at rest will spread the gland legs 33 apart in the bottom segment of the clutch illustrated in Fig. 1 and the actuating liquid will not be confined in the inner annular chamber 40. Therefore, the tension of the springs 36 is only sufficient to support the weight of the mercury when the clutch is at rest and the springs do not otherwise prevent free axial movement of the disc members 24. If the rubber of the gland 31 is stiff enough to maintain the mercury in the inner chamber 32 when the clutch is at rest, the springs 36 may be omitted.

The inner surfaces of the gland legs may be provided with a number of very small radial grooves, such as described in connection with Figs. 8 through 12, extending outwardly to the peripheral portions which are clamped between the annular rings 34; thus forming capillary grooves into which a small amount of mercury can flow when the inner surfaces of the legs are pressed too firmly in contact with each other by the spring clips 36, or otherwise.

Such capillary grooves may be provided to permit an initial escape of a small amount of mercury from the inner annular chamber to prevent an undue delay in expanding the gland by centrifugally developed liquid pressure. Thus, in some instances where the slight tension of the spring clips 36 is too strong, or where the tension of the springs change from their initial predetermined tension, or when suction may develop between the contacting gland legs due to a long period of clutch idleness, or when tackiness on the contacting rubber leg surfaces causes a slight adherence of the rubber, the driving member may come up to speed, but the small amount of pressure developed centrifugally by the liquid contained in the inner annular gland may be insufficient to initiate the flow of mercury outward between the gland and legs.

Under such circumstances, if the movement of mercury outward between the gland legs is initiated by outward flow in the capillary grooves, it will continue after the static inertia of the body of liquid in the inner annular chamber has been overcome and the mercury therein rotates with the driving member.

The amount of liquid which may be present in the capillary grooves however is very slight as compared with the body of liquid contained in the inner annular chamber so that for the purposes of the present invention in obtaining inertia delayed clutch engagement, the liquid is substantially confined in the inner annular chamber.

The operation of the clutch is illustrated in Figs. 1 and 3, wherein Fig. 1 shows the parts when the clutch is at rest and Fig. 3 shows the parts when the clutch is engaged. When the driving member commences to rotate, there is no load on the same and if shaft 2 is the shaft of a motor, the motor will come up to speed rapidly under no load. The discs 24 splined to sleeve 1 rotate therewith. There is no direct positive drive between the discs 24 and the legs 33 of the gland 31 but there are large areas of rubber to disc contact between the gland legs and the discs; and gland legs 33 are pressed together by the springs 36. Thus, there is sufficient frictional resistance between the discs and gland legs to rotate the gland 31 with the discs. There is also some frictional engagement between the inner edges of rings 34 which clamp the peripheral portions of the gland legs together, and the peripheral edges of the discs 24 which carry the weight of the rings and the gland upon the upper half of the relatively long periphery of the discs. Thus, the gland will always rotate with the discs and the driving shaft.

However, the body of liquid or mercury contained within the inner annular compartment 40, because of its static inertia and of the low frictional resistance between the liquid and the circumferentially smooth and uninterrupted annular walls of the compartment 40, does not commence to rotate immediately. A time interval elapses before the body of liquid rotates at a speed sufficient to throw the mercury outwardly and force the gland legs apart. Finally, as the liquid body rotates faster and faster, the liquid is thrown outward to the position shown in Fig. 3 forming a liquid annulus 41, the pressure of which spreads the gland legs 33 apart and establishes a liquid driving chamber 42 in which the liquid pressure annulus 41 is contained.

The pressure of the liquid in the liquid annulus 41 not only forms the annular chamber 42 but it presses against the discs 24 to move them axially away from each other and to engage the surfaces of the friction material rings 27 with the inner surface 29 of the driven member housing wall 13 and the inner surface 30 of the housing plate 15, thereby engaging the clutch as shown in Fig. 3. When engaged, maximum pressure is exerted by the liquid ring 41 so that maximum torque is transmitted by the clutch, uneffected or undiminished by reason of delayed engagement of the clutch.

Since there is nothing but driving liquid within the gland 31, the change of location of the liquid from annular chamber 40 to the annular liquid driving chamber 42 causes a change in shape of the gland somewhat as illustrated. The bulb-like cavity 32 collapses outwardly as indicated at 32a in Fig. 3 because of the evacuation of liquid therefrom creating a vacuum behind the liquid and drawing the bulb-like gland walls 32 outward toward annular compartment 42. The described change in shape of the gland 31 results by forming the same of rubber or other flexible material. The gland 31 is prevented from expanding radially because of the location of its seal 34—35 around its outer periphery so that all of the pressure of the liquid within the gland in engaged position is exerted axially of the clutch causing axial expansion of the gland walls.

The annular liquid pressure ring 41 has a mean diameter substantially larger than that of the annular liquid ring contained in inner compartment 40 when the clutch is at rest. The mean diameter of the inner annular chamber is not more than one-half of the mean diameter of the driving chamber. The height of the liquid column in the annular liquid ring 41 is comparatively great so that high pressures are developed through the action of centrifugal force within the liquid pressure ring 41 in spite of the small volume of liquid utilized. In other words, the pressure developed is determined by the height of the liquid column from point A to point B in Fig. 3 irrespective of the thickness of the column between the inner surfaces of the legs 33 of the gland 31.

The construction of the axial pressure clutch of Figs. 1, 2 and 3 is very simple and each of its constituent elements may be readily fabricated by easy and inexpensive operations. All of the metal parts are simple castings, stampings or automatic machine tool products, which may be finished by a small amount of machining or grinding. The thrust washers and bearing sleeve may be formed of any desired bearing material and may be lubricated readily and easily. The friction members 27 are of simple disc-like shape readily fabricated. The rubber gland 31 is easy to mold and may be readily filled with the actuating liquid and sealed.

Only a relatively small amount of mercury is necessary for operating the clutch when mercury is used as the actuating liquid. The amount of mercury is very small in proportion to the load carried or transmitted by the clutch. Thus, the cost and weight of mercury used, and therefore the cost and weight of the clutch, is at a minimum. Even though a small amount of mercury is used, the mercury is effective in exerting great force against the discs 24 carrying the friction members 27.

Figure 5:
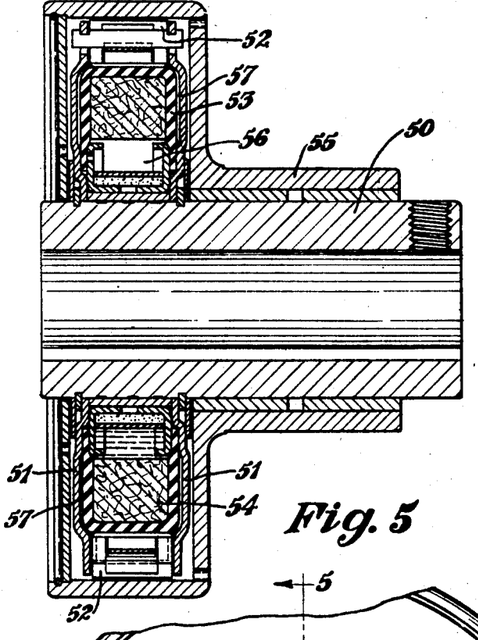
Fig. 5 is an enlarged vertical section taken on the line 5—5 of Fig. 6 showing a radial clutch incorporating certain of the improvements of the present invention with the clutch parts in the position that they assume when the clutch is at rest.
Figure 6:
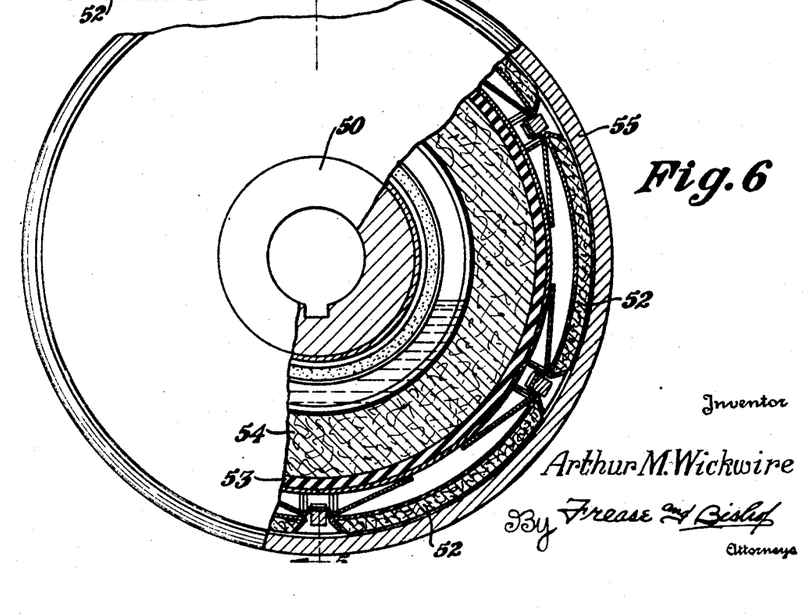
Fig. 6 is an end view of the clutch shown in Fig. 5 with parts broken away.
Figure 7:
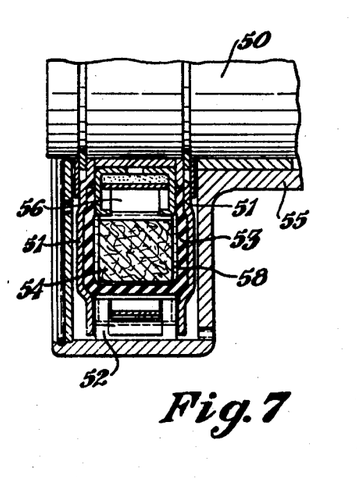
Fig. 7 is a fragmentary view similar to a portion of Fig. 5 but illustrating the parts in the position that they assume when the clutch is running and engaged.

The principles of effecting delayed engagement of a liquid actuated clutch described in detail hereinabove with respect to an axial pressure clutch, may also be applied in a radial liquid actuated centrifugal clutch such as illustrated in Figs. 5, 6 and 7.

Most of the details of construction of the radial pressure clutch of Figs. 5, 6 and 7 do not form any part of my invention but are disclosed and claimed in the copending application of H. J. Zimmermann, Serial No. 538,869, filed June 5, 1944, now Patent No. 2,400,586. A radial pressure clutch of this type includes a driving member 50 on which disc members 51 are mounted carrying friction shoes 52 and a rubber gland 53 within which a filler ring 54 is provided. A driven member 55 surrounds the shoes and is driven by engagement of the shoes 52 when the clutch is in engaged position illustrated in Fig. 7. An inner annular chamber 56 is formed in the driving member wherein a quantity of driving liquid, preferably mercury, is contained. As some air may be contained in the chamber 56, the clutch is provided with means permitting the chamber to breathe while preventing the escape of driving liquid such as disclosed in said Patent No. 2,400,586. However, the chamber 56 may be completely filled with mercury if desired.

In accordance with the present invention, the rubber gland 53 is stretched tightly around the outside and two side annular surfaces of the filler ring 54 so as to substantially confine the driving liquid within the inner annular chamber 56 when the clutch is at rest. A clearance space 57 is provided in the discs 51 along the legs of the gland 53 opposite the side surfaces of the filler ring 54 so that the driving liquid may expand the legs axially and form an outer hollow annular liquid driving ring 58 when the clutch is engaged.

By confining the driving liquid within the inner annular chamber 56, when the clutch is at rest, a time interval must elapse after rotation of the driving member before the liquid in annular chamber 56 commences to rotate and to be thrown outward to form the liquid driving ring 58 thereby providing for delayed engagement of the radial pressure clutch illustrated, without the use of springs which would reduce the amount of torque transmitted by any given size of clutch.

A modified form of axial pressure clutch incorporating the improvements of the present invention is illustrated in Figs. 8 through 12. The driving member includes a driving sleeve or hub 59 which may be secured to a driving shaft by a set screw 60, the outer surface of the sleeve 59 being provided with a knurled annular zone 61 adjacent one end thereof. Two flanged torque plates 62 and 63 are pressed onto the knurled portion 61 of hub 59; and an annular, flexible, preferably rubber gland 64 is located between the plates 62 and 63. The gland 64 is preferably generally U-shaped in cross-section with a bulb-like formation 65 therein when the clutch is at rest. The legs of the gland extend inwardly and are clamped at 66 by a clamping ring 67 when the discs 62 and 63 are forced onto the knurled portion 61 of hub 59.

A body of mercury 68 fills the inner annular compartment formed by the bulb-like gland portion 65; and the gland walls 69 extend outwardly of the bulb-like portion between pressure rings 70 which may be formed of Bakelite, or other plastic or heat-insulating material.

Figures 8, 9, 10, 11, 12:
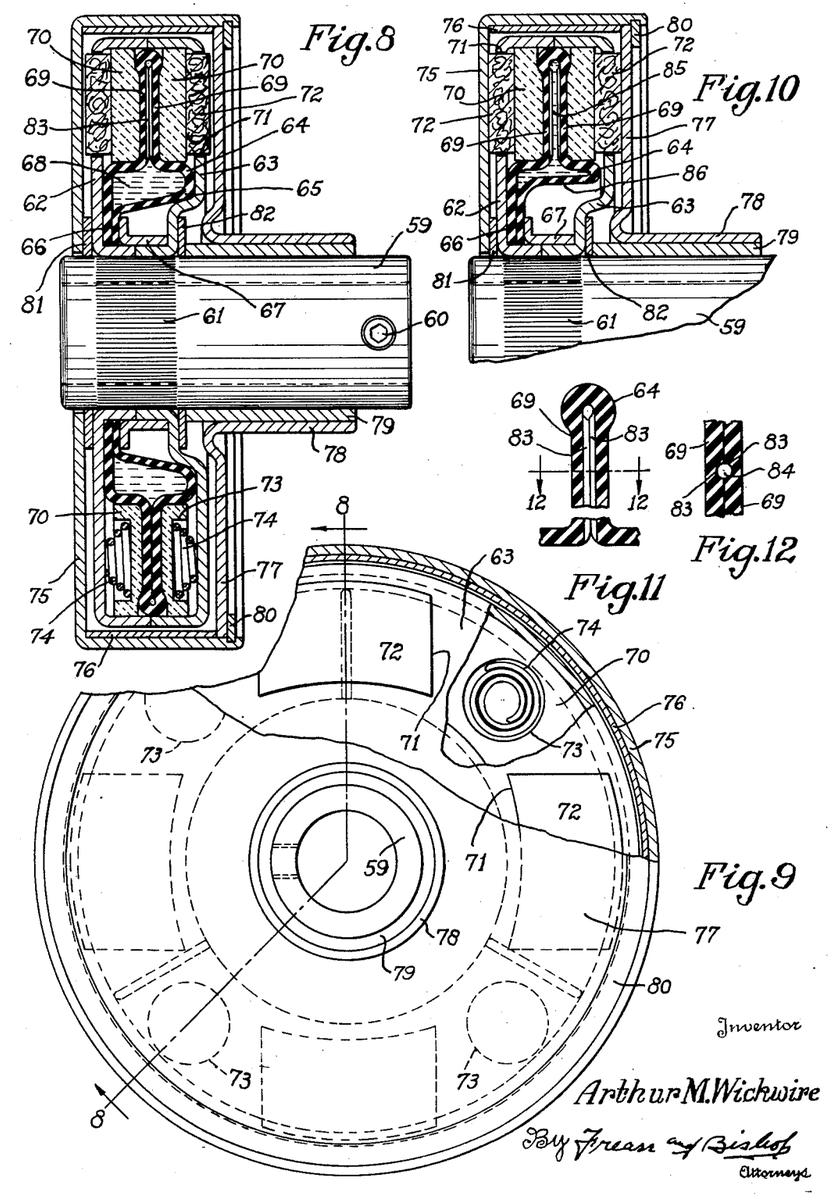
Fig. 8 is an enlarged vertical section taken on the line 8—8, Fig. 9, of a modified form of axial clutch incorporating the improvements of the present invention with the clutch parts in the position that they assume when the clutch is at rest.
Fig. 9 is an end view of the clutch shown in Fig. 8 with parts broken away and in section.
Fig. 10 is a fragmentary view similar to a portion of Fig. 8 but illustrating the parts in the position that they assume when the clutch is running and engaged.
Fig. 11 is an enlarged fragmentary sectional view of the gland in the clutch illustrated in Figs. 8, 9 and 10.
Fig. 12 is a fragmentary section taken on the line 12—12, Fig. 11.

The torque plates 62 and 63 have windows 71 formed therein receiving flat segmental friction shoes 72. Recesses 73 are formed in the pressure rings 70, between windows 71, for receiving preferably spiral helical springs 74 engaging the inner surfaces of the torque plates 62 and 63, and normally pressing the pressure rings 70 toward each other to collapse the outer gland walls 69 as illustrated in Fig. 8. The springs 74 normally have only sufficient tension to sustain the weight of the mercury and maintain it in the inner annular chamber when the clutch is at rest as illustrated in Fig. 8.

The driven member may include a cup member 75 having an inner sleeve 76 and provided with a cover member 77 having a hub portion 78 journaled on bearing 79 on hub member 59. A snap ring 80 may be used to maintain the parts 75 and 77 assembled; and thrust washers 81 and 82 may be interposed between the torque plates 62 and 63, and the driven housing member 75 and sleeve bearing member 79.

A series of grooves 83 may be formed in the inner surfaces of the gland walls 69 leading from the inner annular compartment in which the mercury is normally contained, substantially to the outer periphery of the gland, forming capillary grooves or passages 84. Three of such capillary passages are indicated in dotted lines in Fig. 9. These capillary passages permit the flow of mercury to be initiated from the inner annular compartment outward between the gland walls 69 after the mercury in the inner annular compartment 68 rotates at sufficient speed to be thrown outward, as previously described.

In Fig. 10, the position of the parts is illustrated with the clutch in engaged position after the mercury has been thrown outward to form a driving chamber 85. As the gland may be completely filled with mercury, a wall of the inner annular chamber may collapse somewhat as indicated at 86 when the clutch is in engaged position.

Thus, the axial pressure clutch of Figs. 8 through 12 incorporates the same principles of inertia delayed engagement that are incorporated in the other embodiments of the invention illustrated, and the capillary grooves insure clutch engagement after a predetermined time interval has elapsed, even though inaccurate spring tensions may develop, or suction or adherence may occur between contacting rubber gland walls, which may result from an extended period of clutch idleness.

Certain details of the construction of the axial pressure clutch of Figs. 8, 9, 10, 11 and 12 are disclosed and claimed in the copending application of Wickwire and Zimmermann Serial No. 580,682, filed March 2, 1945, now Patent No. 2,452,008.

Accordingly, the present invention provides an improved liquid actuated centrifugal clutch construction which overcomes the disadvantages and difficulties of prior art clutches; in which delayed engagement of the clutch may be accomplished without effecting the amount of torque transmitted by the clutch at rated speed; which provides for delayed clutch engagement independently of any particular speed of rotation of the driving member; and in which delayed clutch engagement is determined primarily by the lapse of a predetermined time interval after the clutch driving member has commenced to rotate or has attained rated speed.

Also, the present invention provides an improved axial mercury actuated centrifugal clutch construction of few parts and of simplified design; in which an expansible gland is utilized, formed of rubber or other flexible or expansible material; and in which gland the actuating fluid is sealed and is maintained within an annular compartment closely surrounding the axis of the driving member when the clutch is at rest.

The embodiments of the present improvements are illustrated and described herein by way of example, and the scope of the present invention is not limited to the exact details of construction of the various parts.

Finally, in the foregoing description certain terms have been used for brevity, clearness and understanding; but no unnecessary limitations are to be implied therefrom beyond the requirements of the prior art, because such words are utilized for descriptive purposes herein and not for the purposes of limitation, and are intended to be broadly construed.

Thus, the term "gland" as used herein and in the appended claims, refers to and includes all of the means or members which form the walls of the compartment in which the actuating liquid is contained. The gland is expansible so that the gland walls form an inner annular chamber when the clutch is at rest and may form an outer annular driving chamber due to contrifugally developed liquid pressure when the liquid has reached a sufficient rotative speed. The gland walls may be formed substantially entirely of rubber or other flexible or expansible material as illustrated in Figs. 1 through 4, and 8 through 12; or may comprise rubber walls, filler ring means and sealing means, as illustrated in Figs. 5 through 7.

Moreover, when reference is made to "confining" or to "substantially confining" the liquid in the inner annular chamber of the gland when the clutch is at rest, such terms are not intended to exclude the presence of a small amount of liquid in capillary grooves communicating with the inner annular chamber.

Having now described the features of the invention, the construction, operation and use of preferred embodiments thereof, and the advantageous, new and useful results obtained by the improved constructions; the new and useful devices, constructions, arrangements, combinations, sub-combinations, parts and elements, and reasonable mechanical equivalents thereof obvious to those skilled in the art, are set forth in the appended claims.

I claim:

1. In a liquid actuated centrifugal clutch, driving means, an annular expansible liquid containing gland associated with the driving means having an inner annular liquid containing compartment formed therein when the clutch is at rest, there being collapsed contacting gland walls extending outward from said compartment when the clutch is at rest, separated capillary grooves formed in said gland walls extending outwardly thereof and communicating with said compartment, a body of liquid contained in said compartment, driven means adjacent the expansible gland, and intervening friction means movable by and adjacent the collapsed gland walls and actuated to establish driving engagement between said driving and driven means upon movement of the liquid outward of the inner annular compartment under centrifugal force upon rotation thereof thereby expanding said collapsed gland walls.

2. In a clutch, driving means, an annular flexible rubber gland generally U-shaped in cross-section, inner flexible wall portions of the gland being enlarged to bulb-like shape forming an inner annular chamber, there being collapsed flexible driving chamber forming gland walls extending outwardly of the bulb-like shape, a body of mercury contained in and filling said chamber when the clutch is at rest, means substantially confining said body of mercury within said chamber when the clutch is at rest until the mercury in the chamber is rotated rapidly enough to throw it outward to overcome the confining means and expand the collapsed gland walls by centrifugally developed liquid pressure to form a driving chamber within the gland, driven means, and friction means movable by and adjacent the collapsed gland walls and actuated to establish driving engagement between the driving and driven means upon expansion of the collapsed gland walls.

3. In a liquid actuated clutch wherein driving engagement between driving and driven members is established upon rotation of one of the members by liquid thrown centrifugally outwardly from an inner annular chamber in which the liquid is located when the clutch is at rest—flexible walls forming an expansible annular gland, circumferentially uninterrupted inner flexible wall portions of said gland forming an inner annular chamber, outer wall portions of said gland forming an outer pressure chamber when the gland is expanded, a body of liquid completely filling said inner chamber forming an annular liquid ring therein, means substantially maintaining said liquid in said inner chamber when the clutch is at rest and until the walls of said inner chamber rotate the liquid rapidly enough to throw it outward to overcome the maintaining means and expand the gland by centrifugally developed liquid pressure to form said outer chamber, and friction means adjacent the gland walls associated with the driving and driven members and moved into engagement upon expansion of the gland; whereby a predetermined time interval elapses after the driving member commences to rotate before the liquid ring rotates sufficiently rapidly to be thrown from said inner chamber to expand the gland and form said outer chamber and move the friction means to cause engagement of the clutch.

4. In a mercury actuated clutch wherein driving engagement between driving and driven members is established upon rotation of the driving member by mercury thrown centrifugally outwardly from an inner annular chamber carried by the driving member and in which the mercury is located when the clutch is at rest—an expansible annular gland having flexible annular outer and side walls rotatable with the driving member, there being an inner annular chamber formed in the gland with circumferentially smooth walls, said outer and side gland walls forming an outer pressure chamber when the gland is expanded, a body of mercury in said inner chamber, means sustaining the weight of the mercury when the clutch is at rest substantially confining the mercury in said inner chamber, the pressure of the mercury upon rotation of said body of mercury being operative to expand said flexible annular outer and side gland walls and form said outer chamber in communication with said inner chamber when the walls of the inner chamber rotate the mercury rapidly enough to throw it outward and overcome the confining means, and friction means adjacent the gland walls associated with the driving and driven members and moved into engagement upon expansion of the gland; whereby a predetermined time interval elapses after the driving member commences to rotate before the mercury rotates sufficiently to be thrown from said inner chamber to expand the gland and form said outer chamber and move the friction means to cause engagement of the clutch.

5. In an axial mercury actuated clutch wherein driving engagement between driving and driven members is established upon rotation of the driving member by mercury thrown centrifugally outwardly from an inner annular chamber carried by the driving member and in which the mercury is located when the clutch is at rest—an annular flexible rubber gland U-shaped in cross section rotatable with the driving member, the inner annular portion of the gland being enlarged to bulb-like shape forming an inner annular flexible walled chamber closely surrounding the axis of the driving member, the legs of the U extending outwardly of the inner chamber and contacting each other when the driving member is at rest and movable out of contact to form an outer pressure chamber when the gland is expanded, annular means surrounding the outer periphery of the gland clamping the outer ends of the U legs together in liquid-tight sealing relation, a body of mercury within the gland completely filling the inner chamber, and means confining said body of mercury within the inner chamber when the driving member is at rest; whereby a predetermined time interval elapses after the driving member commences to rotate before the mercury rotates sufficiently in the inner chamber to be thrown outwardly by centrifugal force between the legs of the U to expand the gland and form said outer chamber.

6. In an axial mercury actuated centrifugal clutch, a driving member, friction disc means rotatably mounted for axial movement on the driving member, an annular U-shaped flexible rubber gland rotatable with the driving member and centered by said friction disc means provided with inner annular flexible rubber walls forming an inner annular chamber when the gland is at rest and having collapsed rubber outer pressure chamber forming walls extending from said inner chamber walls, a body of mercury completely filling said inner chamber, means confining the mercury in said inner chamber when the gland is at rest, the pressure of the mercury upon rotation of said body of mercury being operative to expand said collapsed walls and form said outer chamber in communication with said inner chamber when the walls of the inner chamber rotate the mercury rapidly enough to throw it outward and overcome the confining means, said friction disc means being located adjacent the gland walls and movable axially by the gland walls upon expansion of the gland walls, and a driven member having walls engaged by said friction disc means when the collapsed gland walls move the friction disc means upon being expanded.

7. In a mercury actuated clutch wherein driving engagement between driving and driven members is established upon rotation of the driving member by mercury thrown centrifugally outwardly from an inner annular chamber carried by the driving member and in which the mercury is located when the clutch is at rest—an annular flexible rubber gland generally U-shaped in cross section rotatable with the driving member, the inner annular portion of the gland being enlarged to bulb-like shape forming an inner annular flexible walled chamber closely surrounding the axis of the driving member, the gland walls extending outwardly of the bulb-like shape and being normally collapsed and being movable to form an outer pressure chamber when the gland is expanded, means extending annularly of the gland securing the gland legs in liquid-tight sealing relation, a body of mercury within the gland completely filling the inner chamber when the gland is at rest, and means substantially confining said body of mercury within said inner chamber when the clutch is at rest; whereby a predetermined time interval elapses after the driving member commences to rotate before the mercury rotates sufficiently in the inner chamber to be thrown outwardly by centrifugal force between the outwardly extending gland walls to expand the gland and form said outer chamber.

8. In an axial mercury actuated centrifugal clutch, a driving member, friction member means mounted for rotation with and axial movement relative to the driving member, an annular U-shaped rubber gland rotatable with the driving member formed with an inner annular rubber walled chamber when the driving member is at rest and having collapsed rubber outer pressure chamber forming walls extending from said inner chamber, a body of mercury in said inner chamber, means substantially confining the mercury in said inner chamber when the gland is at rest, the pressure of the mercury upon rotation of said body of mercury being operative to expand said collapsed walls and form said outer chamber in communication with said inner chamber when the walls of the inner chamber rotate the mercury rapidly enough to throw it outward and overcome the confining means, said friction member means being located adjacent the gland walls and being movable by the gland walls upon expansion of the gland walls, and a driven member having friction members adapted to be engaged by said friction means when the collapsed gland walls move the friction means upon being expanded.

ARTHUR M. WICKWIRE.

REFERENCES CITED

The following references are of record in the file of this patent:

UNITED STATES PATENTS

| Number | Name | Date |
|---|---|---|
| 1,618,643 | Dickson | Feb. 22, 1927 |
| 1,651,212 | Linderman | Nov. 29, 1927 |
| 2,400,586 | Zimmermann | May 21, 1946 |
| 2,452,008 | Wickwire et al. | Oct. 19, 1948 |

FOREIGN PATENTS

| Number | Country | Date |
|---|---|---|
| 347,511 | Great Britain | Apr. 30, 1931 |
| 684,973 | France | Mar. 25, 1930 |
| 695,611 | France | Sept. 30, 1930 |